No. 12,025. Reissued Aug. 26, 1902.

W. C. GREGG.

RAILROAD TIE.

(Application filed Sept. 23, 1901.)

WITNESSES.
E. G. Sawyer
M. E. Cooley

INVENTOR
WILLIAM C. GREGG
BY Paul & Paul
ATTORNEYS

THE NORRIS PETERS CO., PHOTO-LITHO., WASHINGTON, D. C.

UNITED STATES PATENT OFFICE.

WILLIAM C. GREGG, OF MINNEAPOLIS, MINNESOTA, ASSIGNOR TO WM. C. GREGG & CO., A CORPORATION OF MINNESOTA.

RAILROAD-TIE.

SPECIFICATION forming part of Reissued Letters Patent No. 12,025, dated August 26, 1902.

Original No. 638,922, dated December 12, 1899. Application for reissue filed September 23, 1901. Serial No. 76,319.

*To all whom it may concern:*

Be it known that I, WILLIAM C. GREGG, a citizen of the United States, residing at Minneapolis, county of Hennepin, State of Minnesota, (formerly a resident of Honolulu, Island of Oahu, Hawaii,) have invented a new and useful Improvement in Railroad-Ties, of which the following is a specification, reference being had to the accompanying drawings and to the letters of reference thereon.

My invention relates to railway construction, and especially to the construction of portable or temporary railways; and it consists in providing metallic ties to which the rails may be securely clamped and firmly held and from which they may readily be released, thereby adapting it to be used any number of times and in any desired locality.

To these ends my invention consists of a metallic tie and its accompanying device for clamping the rails thereto, substantially as herein shown and hereinafter described.

Figure 1:
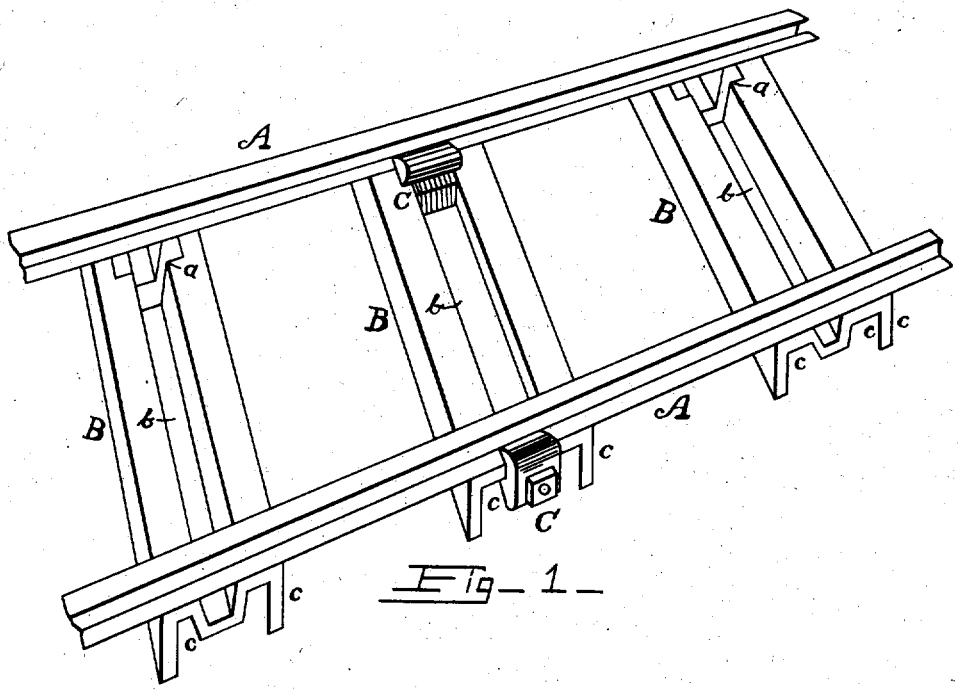
Figure 2:
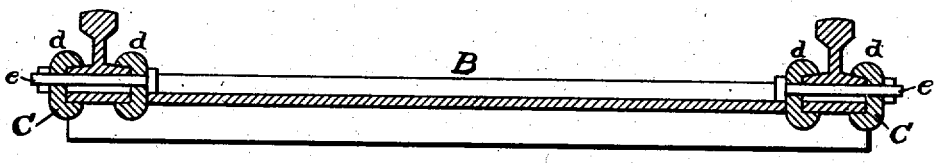
Figure 3:
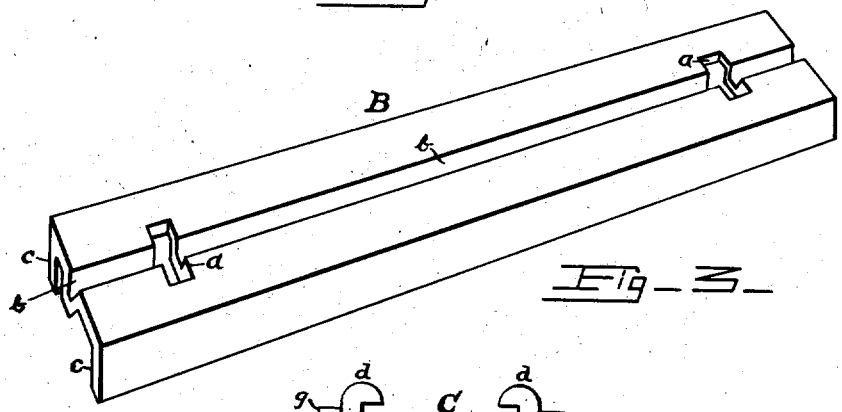
Figure 4:
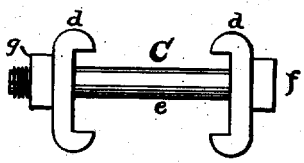

In the drawings, Figure 1 is a perspective view of a section of a railroad constructed with my improved ties; Fig. 2, a cross-section of the same; Fig. 3, a perspective view of one of my ties with the clamps removed, and Fig. 4 a side elevation of the clamping device.

Similar letters refer to similar parts throughout the several views.

A is the rail, B the tie, and C the clamping device. The rail A is not unlike the T-rails commonly used, and hence needs no description.

The tie B, I fashion in the following manner: Taking a blank sheet of metal of the proper proportions, I first punch the holes *a* therein, after which I roll or stamp it to form the longitudinal groove *b* therein and turn its parallel edges downward to form the longitudinal flanges *c*. The holes *a* are designed for and are adapted to receive the inner one of each pair of jaws of the clamping device C, and the longitudinal flanges *c* are adapted to embed themselves in the earth, thus preventing the tie from "creeping." The longitudinal flanges, however, are not essential to the operation of the clamping device, as this device, it will be seen, will operate the same whether the tie is provided with the longitudinal flanges or not.

The clamping device C consists of two reversely-arranged laterally-pierced jaws *d* and the clamp-bolt *e*. The jaws *d* are laterally bent at either end, thus forming clutches, one of which overlaps the foot or base of the rail A and another of which underlaps the deck of the tie B. The clamp-bolt *e* is fashioned with a head *f*, which at its opposite end is exteriorly threaded to receive the interiorly-threaded nut *g*.

In practice I lay my ties in the usual manner, with the depending flanges *c* downward. I next affix the inner jaws *d* of the clamping device C in place within the holes *a* of the tie B. I next pass the threaded ends of the clamp-bolts *e* through the laterally-pierced jaw *d*, their heads resting in the longitudinal groove *b* of the tie B (wherein they are prevented from turning) and their threaded ends projecting outward and beyond the end of the tie B. I now put the rails A in place upon the tie B, the inner edges of their base portion underlying the laterally-bent portion of the jaws *d*. I now affix the outer jaws *d* upon the outwardly-extending threaded ends of the clamp-bolts *e* and screw on the threaded nuts *g*, which secures the rails firmly in place.

It will be understood without a detailed description that the nuts *g* may be removed, thereby releasing the rails, which, with the ties B, can be transported and relaid in other localities.

I claim as my invention—

1. In a railroad-tie, the combination of a laterally-pierced, longitudinally grooved and flanged strip of sheet metal, upon which the rails rest and to which they are secured; a pair of jaws, one of which enters the said lateral openings, and one of which overlaps the end of the said tie, and a clamp-bolt underlying the said rail and uniting the said jaws, substantially as shown and described.

2. In a railroad-tie, the combination of the laterally-pierced and longitudinally-grooved strip of sheet metal having vertically-depending flanges adapted to enter the ground, jaws adapted to enter the said laterally-pierced tie and to engage the base of the said rail, similar jaws adapted to overlap the ends of the said tie, exteriorly-threaded bolts adapted to underlie the said rails and to unite the said jaws, and interiorly-threaded nuts adapted to tighten the said jaws and to clamp the said rails, substantially as shown and described.

3. The combination with a metallic railroad-tie, longitudinally grooved and laterally pierced, and upon which the rails rest and to which they are secured, of a pair of jaws, one of which enters the lateral openings and overlaps the foot or base upon the inner side of the rail, and one of which overlaps the end of the tie and the foot or base upon the outer side of the rail, and a clamp-bolt underlying said rail and uniting said jaws, substantially as described.

4. The combination with a metallic railroad-tie, longitudinally grooved and laterally pierced, and upon which the rails rest and to which they are secured, of a pair of jaws, one of which enters the lateral openings and overlaps the foot or base upon the inner side of the rail, and one of which engages the tie and overlaps the foot or base of the rail upon its outer side, and a clamp-bolt underlying said rail and uniting said jaws, substantially as described.

In testimony whereof I have hereunto set my hand this 28th day of August, 1901, at Minneapolis, Minnesota.

WILLIAM C. GREGG.

In presence of—
A. C. PAUL,
M. E. GOOLEY.